Aug. 14, 1962  J. C. NEILSON  3,049,147
RECIPROCATING SYSTEM AND VALVE THEREFOR
Filed July 24, 1961  2 Sheets-Sheet 1
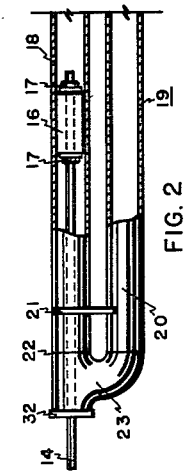
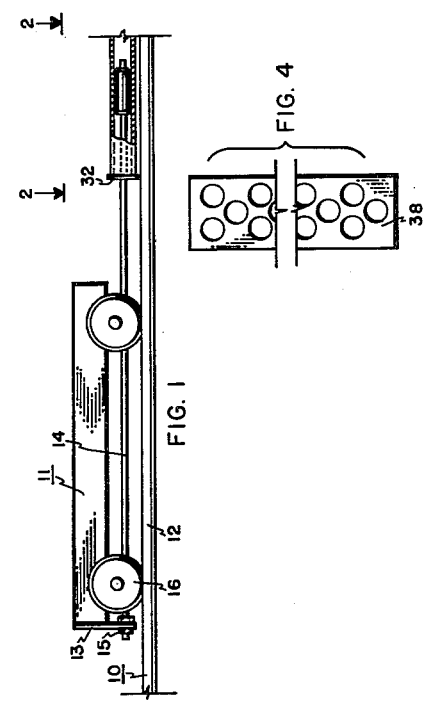
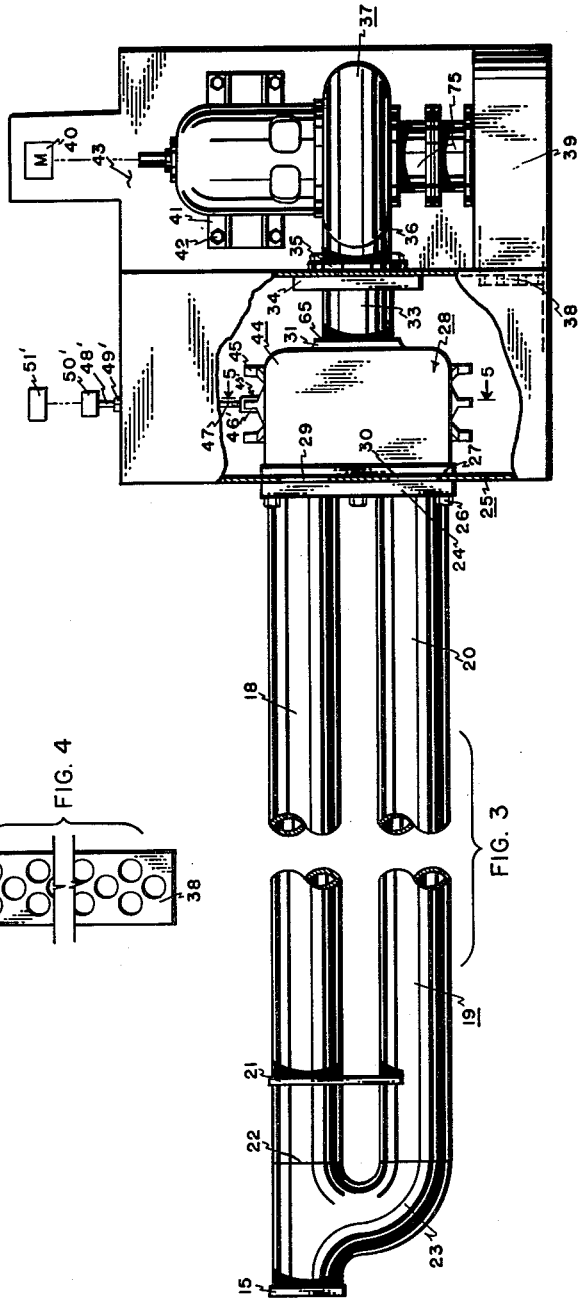
*INVENTOR.*
JAY C. NEILSON
BY *M. Ralph Shaffer*
HIS ATTORNEY Aug. 14, 1962  J. C. NEILSON  3,049,147
RECIPROCATING SYSTEM AND VALVE THEREFOR
Filed July 24, 1961  2 Sheets-Sheet 2

INVENTOR.
JAY C. NEILSON
BY *M. Ralph Shaffer*
HIS ATTORNEY

United States Patent Office 3,049,147
Patented Aug. 14, 1962

3,049,147
RECIPROCATING SYSTEM AND VALVE THEREFOR
Jay C. Neilson, Salt Lake City, Utah, assignor to Gardner Machines, Inc., Salt Lake City, Utah, a corporation of Utah
Filed July 24, 1961, Ser. No. 126—142
3 Claims. (Cl. 137—622)

The present invention pertains to systems for reciprocating large loads, principally, and more particularly, to a new and improved reciprocating system of a pneumatic or hydraulic type with improved valve therefor, which will ensure increased efficiency in producing effective reciprocating power, and at the same time, provide for features permitting an operational cushioning effect during the operating cycle and allowing a circulation of media during neutral or no-power condition so as to prevent heat build-up in the pump employed.

The present invention is ideally suited for service as a water-type shot-gun feed works in the sawmill industry. The four-way valve associated with the present invention and useable in other contexts is deemed unique in its operational characteristics and low manufacturing cost.

An object of the present invention is to provide a new and improved system for producing reciprocating motion to large loads such as cars or carriages or other timber carrying equipment in the lumber industry.

A further object is to provide a new four-way valve which is so designed as to be capable of operation through direct mechanical linkages, in addition to being adapted for operation by auxiliary low-power means of hydraulic, pneumatic, or electrical character.

A further object of this invention is to provide a reciprocating system and valve providing for bleed-through of the medium through the valve during neutral no-power condition, and by the same means, accomplish a cushioning effect when the system reverses direction in its operating cycle.

A further object is to provide a valve of the type described wherein the bypass means is effectively withdrawn from function in the valve when the valve is on one of the pressure or power positions, so that all of the available power from the prime source is then made available for performing useful work.

A further object is to provide a four-way valve of the type described, wherein the hydraulic fluid or other media used can be metered either on the exhaust side of the circuit or the pressure side thereof, this depending upon the particular construction of the valve employed.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a fragmentary side elevation of a portion of a watertype shot-gun feed works, according to the present invention, which may be used in the sawmill industry.

FIGURE 2 is a fragmentary plan view taken along the line 2—2 in FIGURE 1 and is partly broken away for purposes of clarity.

FIGURE 3 is an enlarged plan of the pump, valve, reservoir and cylinder assembly of the feed works, certain portions thereof being broken away and also being illustrated in schematic form.

FIGURE 4 is an elevation of a perforate baffle plate, broken away at the center thereof, which may be used in the structure of FIGURE 3.

Figure 5:
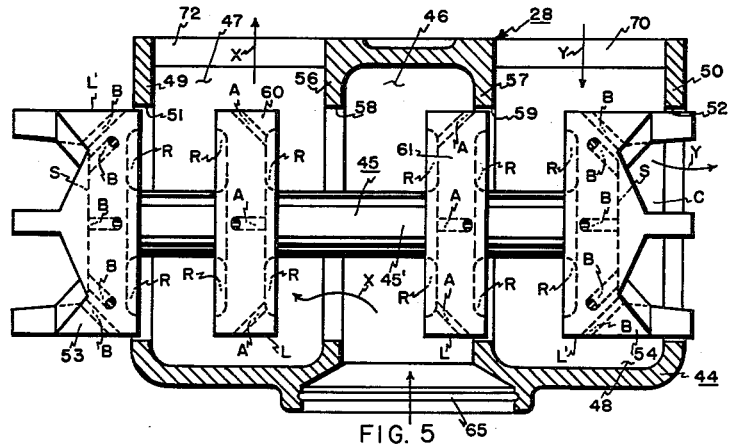
FIGURE 5 is a 90° clockwise rotated section taken along the line 5—5 in FIGURE 3 of the valve body of the unique valve of the present invention; the valve spool is shown disposed in elevation within the valve body, is disposed at one extremity of travel, but for convenience of illustration is not shaded at the lands of the valve gate protuberances thereof.

In FIGURE 1 the sawmill feed works 10 includes the conventional, multi-wheeled car or carriage 11 which reciprocates back and forth along rails 12 (one being shown). For rigid securement, the carriage 11 may be provided with a flange 13 which secures the end of reciprocating rod 14 by means of nuts or other appropriate attachments or securing means 15. The carriage 11, tracks 12, reciprocating rod 14 and attachments 15 are all conventional and may take several forms. Likewise, the manner of the securement of the reciprocating rod 14 to carriage 11 may also take one of a number of forms. While but one track 12 is shown, it will be understood that there exists a pair of juxtaposed horizontally railroad-type tracks with the multiple wheels 16 of car or carriage 11 engaging and riding therealong.

Reciprocating rod 14 extends through an end plate gland 32 to attach to a piston 16 by means of nut and washer attachments 17, for example, on both ends thereof. Where the invention is practiced with a water medium, then it has been found desirous to fabricate piston 16 of wood as the latter when in contact with water will swell so as to keep a tight fit within cylinder 18 of cylinder assembly 19; as a consequence, rings will not need to be employed with the piston 16.

The cylinder assembly 19, in addition to including the basic cylinder 18 for piston 16, also includes a side-branch cylinder 20 which interiorly communicates with cylinder 18 and which is fixedly positioned with respect thereto by brace 21. For purposes of fabrication, there may be included a welded seam line 22 medially of the composite assembly 19, indicating the separate cylinders may be welded or otherwise secured to a Y-type juncture 23 therefor. In any event, the cylinder assembly 19 is provided with a mounting flange 24 which is bolted or otherwise secured by means of attaching bolts 26 to reservoir and mounting flanges 27 of valve 28. Apertures 29 and 30 provide respective communication between the cylinders 18 and 20 and the outlet ports 70 and 72 (hereinafter to be described and explained) of valve 28. The latter (i.e. valve 28) is completely disposed within reservoir 25.

Boss 31 in FIGURE 3 defines an inlet port 65 for valve 28, the latter accommodating a suitable end fitting of conduit 33 leading to reservoir wall backing flanges 34 and 35 and these through to the pressure side (at 36) of pump 37. Many types of pumps (at 37) might be employed e.g. gear pumps, piston type pumps or other types; the inventor, however, prefers to employ a centrifugal-type pump wherein operating efficiencies are high. A perforate baffle plate 38 (FIGURES 3 and 4) serves as a perforated partition between reservoir 25 and the pump intake chamber 39; the perforate baffle plate 38 serves to dampen excessive turbulence between the reservoir area and the pump for proper operation of the system. Pump 37 is driven by the conventional motor 40, the former being secured by bracket 41 and attachments 42 to a bottom base plate or pump platform 43.

While the invention need not be restricted to such design, it is deemed preferable that the reservoir 25 constitute as shown an elongate, upstanding, rectangular enclosure having a lower, rearwardly extending platform 43 for mounting the motor 40 and pump 37. Means 75 are provided for permitting the interior communication of pump 37 and the pump intake chamber 39.

As shown in FIGURE 3, the valve body structure 44 of valve 28 is provided with an interiorly disposed, reciprocating valve spool 45, stem 45' of which is provided with an outwardly protruding lug 46'. This lug 46' may receive the threaded end 47 of a reciprocating rod 48'. the latter passing through a reservoir bushing-and-gland 49'. Rod 48' may be actuated by a motor 50' as controlled by a conventional switching circuit 51'. Any number of possible means may be used to drive the reciprocating valve spool 45. Thus, instead of the motor and switching circuit, there may be employed simply a conventional power means which drives by an eccentric a reciprocating rod and link system. Any number of conventional constructions are possible for imparting a conventional reciprocating motion to the valve spool 45. It should be added in this regard that the valve is so designed as to be operable by direct mechanical linkages between the valve and operator personnel when operated manually or by other types of power means such as hydraulic or pneumatic applied systems.

Figure 6:
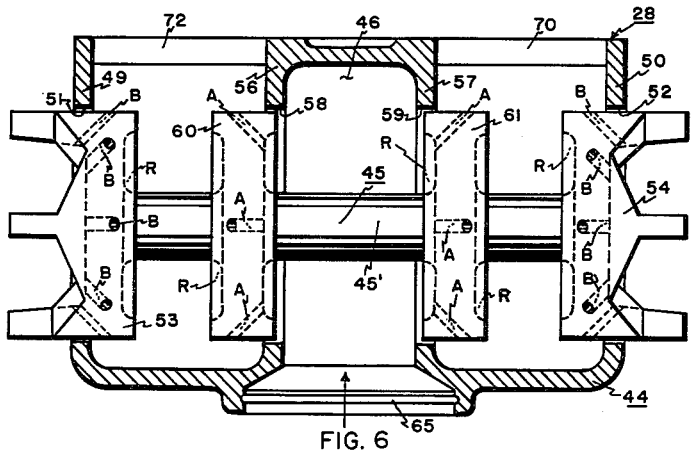
FIGURE 6 is a section similar to FIGURE 5 but illustrates the valve spool in its central location.
Figure 7:
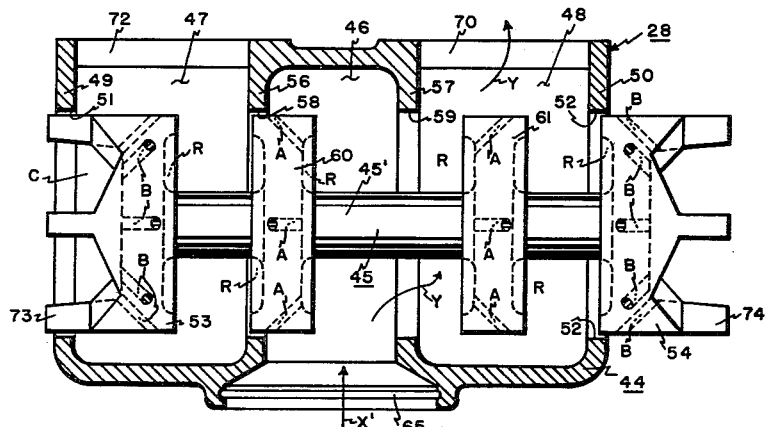
FIGURE 7 is a section similar to FIGURES 5 and 6 but illustrates the valve spool as being at its opposite extremity of travel relative to that shown in FIGURE 5.

In FIGURES 5 through 7, the component 45 is a true diameter type valve spool which can be cast, fabricated or otherwise manufactured by any means that is conducive to low cost production. Valve spool 45 is tightly disposed within the valve body 44 as will be hereinafter described. Valve body 44 is preferably an integral structure defining side chambers 47 and 48 and preferably including a central chamber 46. End partitions 49 and 50 define at their lands respective gateways 51 and 52, hereinafter termed outer gateways, which slidably cooperate in bearing engagement with valve gate protuberances 53 and 54 of valve spool 45. Correspondingly, medial partitions 56 and 57 define, at their inner lands, inner gateway means 58 and 59, these serving to cooperate in slidable bearing engagement with inner valve gate protuberances 60 and 61.

Each of the valve gate protuberances 53, 54, 60 and 61 preferably have annular, side recesses R. Further, a plurality of radial askew apertures A are disposed between the lands L of valve-gate protuberances 60 and 61 and the inner annular recesses R (or simply the protuberance sides if no recesses are present).

Additionally, a plurality of radial askew apertures B are disposed between the lands L' of protuberances 53 and 54 and the exterior sides S thereof.

FIGURE 6 illustrates the condition in which the valve spool is in its central or neutral, "no-power" position. Thus fluid pumped by pump 37 into the pump inlet port 65 will enter the central chamber 46 and will be circulated through bypass apertures or orifices A and B of the several valve gate protuberances 53, 54, 60 and 61 to enter the reservoir supply (within 25) exterior of valve 28 and to be circulated through baffle 38 to the pump 37. By the supplying of these bypass apertures or orifices A and B, no additional, external bypass relief system is needed for the pump. "Heat build-up" in the pump is avoided, and horsepower is conserved as the motor-and-pump combination operate substantially at minimum-load point when the valve is in neutral position.

FIGURE 5 illustrates one extremity of travel of the valve spool 45 with respect to the valve body structure 44. In FIGURE 5 it will be noted that the bypass orifices B of the valve gate protuberances 53 are disposed well past partition 49 so that there is an effective blocking of fluid at this point. Hence, fluid entering the valve from the pump in the opening 65 travels in the direction of the arrows X through chamber 57 and out into the cylinder associated therewith. (See FIGURE 3.) It is seen that there is no other path for fluid to travel since the valve gate protubtrance 61 is translated to the left so that the respective bypass orifices A are now cut off from side chamber 48 so that, as hereinafter to be explained, fluid entering chamber 48 in direction Y will be diverted through bypass orifices B, but particularly through the land openings C associated with valve gate protuberance 54 so that such fluid will rush outwardly in the direction of arrows Y to again enter the reservoir.

It should be mentioned at this point that the geometry of the valve spool 45 and the valve body structure 44 is such as to control the quantity of media circulating through the valve assembly by the controlled opening of the end lands of the spool with respect to the valve body. This arrangement enables a metering of the media to be controlled on the exhaust side of the circuit. If desired, the spool could be similarly constructed to permit a metering through the inside lands (of valve gate protuberances of 60 and 61) with respect to the body if this were desired; this latter arrangement would allow the hydraulic media to be metered on the pressure side of the circuit.

In FIGURE 7 the valve is shown at its opposite extremity wherein the side chamber 47 is isolated from the central chamber 46 since the bypass orifices A no longer communicate with side chamber 47, but rather are cut off by the inside lands of partition 56. This blocking-off of side chamber 47 occurs in conjunction with the opening of right hand side chamber 48 so that fluid entering at X' in FIGURE 7 will enter chamber 48 and proceed (as shown by arrows Y) out the valve structure into the cylinder associated with outlet port 70. Remaining outlet port 72 is open for the return of fluid from its cylinder through the chamber 47 and out land opening C so fluid from the left hand cylinder (not shown) will be returned to the reservoir supply.

It is desirous in accomplishing the above four-way valve function that the valve gate protuberances 53 and 54 have guide means 73 and 74 cooperating with the gateways 51 and 52 so as to assure spool alignment and also to provide for the metered opening of the valve lane apertures C.

It will be noted that the bypass orifices A and B are so situated that they operate to effectively prevent production of excessive heat at the motor and pump employed with the valve when the valve spool 45 is in neutral position and yet do not detract from available power when the mechanism is shifted. Additionally, it will be noted that the orifices B are of such size as to permit a cushioning of the hydraulic media as the double-acting hydraulic mechanism 19 is reversed, as to direction of fluid flow, at the end of the piston stroke. Hydraulic media, for example, returning from cylinder 18 through chamber 48 and out land opening C of valve gate protuberance 54 will not be cut off completely in this return flow upon land opening closure since apertures B of protuberance 54 still remain open; this in effect serves to cushion the system against the shock which would otherwise occur when the land openings C are closed on the respective side of the valve. Hydraulic media is moved by the momentum of the given object (here piston 16). These orifices B may be made in the size desired to provide an exact cushioning characteristic that may be desired on any specific application.

With the above discussion of the valve structure and its operation, the composite structure 63 is now readily understood. FIGURE 2 now should also be referred to.

Thus, when in neutral position as shown in FIGURE 6, no power will be supplied piston 16 in FIGURE 2 so that car or carriage 11 in FIGURE 1 is motionless. When the valve 28 is actuated by means 50' and 51' in FIGURE 3 so as to translate the valve spool 45 to the left as illustrated in FIGURE 5, then fluid under the pressure of the pump is caused to proceed through side chamber 47 so as to enter cylinder 20 in FIGURE 3 and subsequently to proceed around the double-cylinder assembly 19 so as to enter the left-hand side of cylinder 18, thereby supplying pressure to piston 16 at the left-hand side thereof. This advances the piston 16 to the right which in turn serves to eject fluid on the right hand side of piston 16 in FIGURE 2 in the direction Y (see FIGURE 5) into the remaining side chamber 48 of valve 28, and to be ejected therefrom into the reservoir supply via land openings C, the latter being formed through the translation of the valve spool to the left. Subsequently, the operating mechanism 51 and motor 50 serve to translate the valve spool 45 in the opposite direction as shown in FIGURE 7. This reverses the procedure by supplying pressure to the right-hand side of piston 16, since the fluid under pressure now entering at X' in FIGURE 7 proceeds along arrows Y out of chamber 48 and into cylinder 18, thus causing a pressured ejection of fluid on the exhaust side of the circuit (to the left of piston 16) with the same being returned through the left-hand side chamber 47 out land opening C into the reservoir. This latter operation (see FIGURE 7) serves to translate the carriage 11 in FIGURE 1 to the left, to starting position.

It will be readily seen that the feedworks mechanism as above described may be operated either manually (by manually transporting the rod 48 back and forth and in central neutral position as desired) or by coupling a suitable reciprocating means to the valve spool as indicated generally at 51 and 53.

It should be mentioned that while the description of the invention has been made in terms of water operation, other hydraulic or pneumatic media may be used.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A valve including, in combination, valve body structure defining: side chambers having respective outlet ports, outer gateways disposed outwardly of and contiguous with respective ones of said side chambers, and inner gateway means disposed between said side chambers and having an inlet port; and an axially translatable, reciprocable spool means comprising a stem, plural, mutually spaced, valve gate protuberance means extending transversely from said stem, guide means integral with outer ones of said valve gate protuberance means and cooperable with said outer gateways for maintaining axial alignment of said valve spool means for all translations thereof, outer ones of said valve gate protuberance means slideably cooperating with respective ones of said outer gateways, inner ones of said valve gate protuberance means slideably cooperating with said inner gateway means, said plural valve gate protuberance means impeding communication between said side chambers and said inlet port when said valve spool is in its central, neutral position, and a respective one of said inner valve gate protuberance means, when said valve spool means is translated to an extremity position of its travel, withdrawing from its gateway means to provide communication between said inlet port and a respective one of said outlet ports while the remaining inner valve gate protuberance means continues to impede communication between said inlet port and the remaining one of said outlet ports.

2. Structure according to claim 1 wherein said valve gate protuberance means are provided with radial, askew bypass orifices, said orifices of said outer valve gate protuberance means providing communication from respective ones of said side chambers through respective ones of said outer gateways when said valve spool means is in its central, neutral position relative to said valve body structure, said orifices of said inner valve gate protuberance means also providing respective communication between said inlet port and said side chambers respectively across said inner gateway means when said valve spool means is in said central, neutral position; and the bypass orifices of each respective outer valve gate protuberance means and the inner valve gate protuberance means respectively remote with respect thereto being closed by their respective outer gateway and inner gateway means when said valve spool means is disposed at a respective extremity of travel with respect to said valve body structure.

3. Structure according to claim 2 wherein said valve body structure also defines a central chamber communicating with said inlet port and delineated from said side chambers on both sides thereof by said inner gateway means, the latter comprising a pair of mutually spaced lands; and wherein said valve gate protuberance means are provided with radial, askew bypass orifices, said orifices of said outer valve gate protuberance means providing communication from respective ones of said side chambers through respective ones of said outer gateways when said valve spool means is in its central, neutral position relative to said valve body structure, said orifice of said inner valve gate protuberance means also providing respective communication between said central chamber from said inlet port across said inner gateway means lands to respective ones of said side chambers when said valve spool means is in said central, neutral position; and the bypass orifices of each respective outer valve gate protuberance means and the inner valve gate protuberance means respectively remote with respect thereto being closed by their respective outer gateway and inner gateway means land when said valve spool means is disposed at a respective extremity of travel with respect to said valve body structure.

References Cited in the file of this patent
UNITED STATES PATENTS

| | | |
|---|---|---|
| 751,572 | Tanner | Feb. 9, 1904 |
| 849,958 | Abrego | Apr. 9, 1907 |
| 1,188,901 | Conradson | June 27, 1916 |
| 1,661,016 | Smith | Feb. 28, 1928 |
| 1,993,612 | Lum | Mar. 5, 1935 |
| 2,242,807 | Austin | Mar. 20, 1941 |
| 2,603,065 | Sarto | July 15, 1952 |